United States Patent [19]

Susi et al.

[11] 3,972,927
[45] Aug. 3, 1976

[54] ALKYLAMIDES OF HINDERED 3,5-DIALKYL-4-HYDROXYBENZOIC ACIDS AND USE AS LIGHT STABILIZERS IN POLYOLEFINS

[75] Inventors: Peter Vincent Susi, Middlesex; John Christian Oppelt, Somerville, both of N.J.

[73] Assignee: American Cyanamid Company, Stamford, Conn.

[22] Filed: Dec. 30, 1974

[21] Appl. No.: 537,153

[52] U.S. Cl. .................. 260/559 R; 260/45.9 NC
[51] Int. Cl.² .......................... C07C 103/26
[58] Field of Search .................. 260/559 R

[56] References Cited
UNITED STATES PATENTS

| | | |
|---|---|---|
| 2,959,550 | 11/1960 | Young et al. .................. 260/559 R |
| 3,496,211 | 2/1970 | Dexter et al. .................. 260/559 R |
| 3,714,122 | 1/1973 | Kline .......................... 260/559 R |

OTHER PUBLICATIONS

Cohen et al, JACS; 84, 1625–1628, 5—5—62.

Primary Examiner—C. Davis
Attorney, Agent, or Firm—Philip Mintz

[57] ABSTRACT

Compounds of the formula:

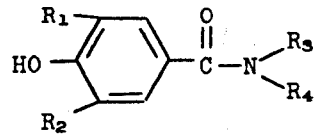

wherein $R_1$ and $R_2$ are each branch-chain alkyl of 3 to 8 carbon atoms and $R_3$ and $R_4$ are each hydrogen, alkyl of 1 to 18 carbon atoms, or cycloalkyl of 5 or 6 carbon atoms are useful as light stabilizers in polyolefins. They may be prepared (a) by reacting the 3,5-di-alkyl-4-hydroxybenzoyl chloride with the appropriate amine in the presence of an acid acceptor or (b) by reacting the corresponding benzoic acid with the appropriate amine in the presence of a carbodiimide as dehydrating agent.

6 Claims, No Drawings

ALKYLAMIDES OF HINDERED 3,5-DIALKYL-4-HYDROXYBENZOIC ACIDS AND USE AS LIGHT STABILIZERS IN POLYOLEFINS

This invention relates to stabilizing polyolefins against the deteriorating effects of light by the use of certain amides of hindered 3,5-dialkyl-4-hydroxybenzoic acids.

As is well known, polyolefins such as polypropylene and polyethylene tend to deteriorate from the effects of light, especially ultraviolet light. This deterioration generally manifests itself as a loss of tensile strength and loss of flexibility of the polymer. In accordance with the present invention, we have discovered that certain amides of hindered 3,5-dialkyl-4-hydroxybenzoic acid can significantly retard or inhibit such deterioration.

The amides of hindered 3,5-dialkyl-4-hydroxybenzoic acid useful for the practice of the present invention include those having the formula:

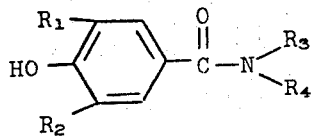

wherein $R_1$ and $R_2$ are each branched-chain alkyl of 3 to 8 carbon atoms and $R_3$ and $R_4$ are each hydrogen, alkyl of 1 to 18 carbon atoms, or cycloalkyl of 5 or 6 carbon atoms. Illustrative of the branched-chain alkyl moieties from which $R_1$ and $R_2$ may be separately selected are isopropyl, $t$-butyl, iso-hexyl, cyclohexyl, 2-ethylhexyl, $t$-octyl, etc. It is preferred for both $R_1$ and $R_2$ to be $t$-butyl because of the commercial availability of 3,5-di-$t$-butyl-4-hydroxybenzoic acid, an intermediate from which the amides of the present invention can be prepared. $R_3$ and $R_4$ are each separately selected from hydrogen; alkyl of 1 to 18 carbon atoms, such as methyl, ethyl, propyl, butyl, hexyl, $n$-octyl, 2-ethylhexyl, decyl, dodecyl, octadecyl, etc; or cycloalkyl of 5 or 6 carbon atoms, such as cyclopentyl or cyclohexyl. Preferably, $R_3$ and $R_4$ together have a total of 6 to 16 carbon atoms.

These new compounds can be prepared in several ways from 3,5-dialkyl-4-hydroxybenzoic acid or its acid chloride. Briefly, one such preparation involves the reaction of the acid chloride with the appropriate amine in the presence of an acid acceptor. Another such preparation involves the condensation of the acid with the appropriate amine in the presence of a carbodiimide as dehydrating agent. Preparations of these new compounds by both these procedures are illustrated in the following examples.

The 3,5-dialkyl-4-hydroxybenzoic acid chloride can be prepared by reacting the corresponding benzoic acid with thionyl chloride in the presence of a catalyst, such as pyridine. The benzoic acid may be purchased (especially the 3,5-di-t-butyl-4-hydroxybenzoic acid) or may be prepared by oxidation of the corresponding aldehyde; see Yohe et al., J. Org. Chem., 1289 (1956) as explained in U.S. Pat. No. 3,206,431 col. 3, lines 32–35. The acid and acid chloride are also described in U.S. Pat. No. 3,330,859 (Examples 3, 5, and 6).

The compounds of this invention are useful for protecting polyolefins, such as polypropylene and polyethylene, against the deteriorative effects of ultraviolet light when used in amounts of about 0.1 to about 2.0 percent by weight, preferably of about 0.2 to about 1.0 percent by weight, on weight of polymer. These compounds may be incorporated into the polyolefin by any of the standard techniques used in industry, such as by milling, extrusion, swelling into the polymer, etc. Other additives, such as processing antioxidants, secondary stabilizers, pigments, dyes, flame retardants, lubricants, plasticizers, etc. may also be included in the polyolefin for their usual purposes.

For further illustration of this invention, reference should be made to the following examples.

EXAMPLE 1

To a solution of 25 milliliters of diethylamine in 50 milliliters of dry benzene was added a solution of 2.0 grams of 3,5-di-$t$-butyl-4-hydroxybenzoyl chloride in benzene. The resulting mixture was refluxed for 1 hour, cooled, and poured into 100 milliliters of cold water. The excess amine was neutralized with dilute hydrochloric acid; the benzene layer was removed, washed with water, dried, and evaporated, leaving an oil. Addition of a small amount of petroleum ether gave crystals, which were filtered, and recrystallized from heptane, yielding 1.3 grams of N,N-diethyl-3,5-di-$t$-butyl-4-hydroxybenzamide; melting point 136°–137.5°C.

EXAMPLE 2

Testing in Polypropylene

The compound of Example 1 (0.5% by was milled into unstabilized polypropylene along with 0.2% by weight of a thermal antioxidant, 2,4,6-tri-$t$-butylphenol. The milled composition was then compression molded into a film 4 mils thick. The compression molded film, and a control film identically prepared except without the compound of Example 1, were exposed in the Fade-Ometer until they failed. The samples were considered as having failed with the carbonyl content in the film, as measured in the infra-red spectrum, reached 0.1%. This carbonyl content generally results in film embrittlement. The test sample lasted 1200 hours, about 2.2 times as long as the control.

EXAMPLE 3

In the manner of Example 1, dicyclohexylamine was reacted with 3,5-di-$t$-butyl-4-hydroxybenzoyl chloride to produce N,N-dicyclohexyl-3,5-di-$t$-butyl-4-hydroxybenzamide; melting point 185°–190°C. When tested by the procedure in Example 2, the sample containing this compound lasted 2400 hours, about 4.4 times as long as the control.

EXAMPLE 4

In the manner of Example 1, di-n-dodecylamine was reacted with 3,5-di-$t$-butyl-4-hydroxybenzoyl chloride to produce N,N-di-n-dodecyl-3,5-di-$t$-butyl-4-hydroxybenzamide; an oil product. When tested by the procedure of Example 2, the sample containing this compound lasted 600 hours, about 2.0 times as long as the control.

EXAMPLE 5

In the manner of Example 1, $n$-butylamine was reacted with 3,5-di-$t$-butyl-4-hydroxybenzoyl chloride to produce N-$n$-butyl-3,5-di-$t$-butyl-4-hydroxybenzamide; melting point 181°–183°C. When tested by the procedure in Example 2, the sample containing this compound lasted 950 hours, about 3.2 times as long as the control.

EXAMPLE 6

In the manner of Example 1, n-octylamine was reacted with 3,5-di-t-butyl-4hydroxybenzoyl chloride to produce N-n-octyl-3,5-di-t-butyl-4-hydroxybenzamide; melting point 133°–135°C. When tested by the procedure of Example 2, the sample containing this compound lasted 1000 hours, about 3.3 times as long as the control.

EXAMPLE 7

To a stirred solution of 25 grams (0.1 mole) of 3,5-di-t-butyl-4-hydroxybenzoic acid and 12.9 grams (0.1 mole) of di-n-butylamine in 100 milliliters of dry tetrahydrofuran was added dropwise a solution of 20.6 grams (0.1 mole) of dicyclohexylcarbodiimide in 75 milliliters of dry tetrahydrofuran. The mixture was stirred for several hours and the white solid (dicyclohexyl urea) was filtered off and discarded. Evaporation of the filtrate gave a white solid, which was recrystallized from 1:1 benzene-hexane to give N,N-di-n-butyl-3,5-di-t-butyl-4-hydroxybenzamide; melting point 94°–95°C. When tested by the procedure of Example 2, the sample containing this compound lasted 1000 hours, about 3.3 times as long as the control.

EXAMPLE 8

In the manner of Example 7, cyclohexylamine was reacted with 3,5-di-t-butyl-4-hydroxybenzoic acid to produce N-cyclohexyl-3,5-di-t-butyl-4-hydroxybenzamide; melting point 236°–237°C. When tested by the procedure of Example 2, this compound lasted 1150 hours, about 3.8 times as long as the control.

EXAMPLE 9

In the manner of Example 7, ammonia was reacted with 3,5-di-t-butyl-4-hydroxybenzoic acid to produce 3,5-di-t-butyl-4-hydroxybenzamide; melting point 263°–265°C. When tested by the procedure of Example 2, this compound lasted 1000 hours, about 2.5 times as long as the control.

EXAMPLE 10

In the manner of Example 7, 2-ethylhexylamine was reacted with 3,5-di-t-butyl-4-hydroxybenzoic acid to produce N-(2-ethylhexyl)-3,5-di-t-butyl-4-hydroxybenzamide; melting point 136°–140°C. When tested by the procedure of Example 2, this compound lasted 1000 hours, about 3.3 times as long as the control.

EXAMPLE 11

In the manner of Example 7, di-n-octylamine was reacted with 3,5-di-t-butyl-4-hydroxybenzoic acid to produce N,N-di-n-octyl-3,5-di-t-butyl-4-hydroxybenzamide; an oil product. When tested by the procedure of Example 2, this compound lasted over 1400 hours, over 4.7 times as long as the control.

EXAMPLES 12–14

When tested by the procedure of Example 2, corresponding amides prepared from aromatic amines were found to be ineffective, in that the time to failure did not significantly exceed the time to failure of the control. Amides tested were (Example 12) N-o-tolyl-3,5-di-t-butyl-4-hydroxybenzamide; (Example 13) N-p-tolyl-3,5-di-t-butyl-4-hydroxybenzamide; and (Example 14) N-(2-hydroxyphenyl)-3,5-di-t-butyl-4-hydroxybenzamide. Accordingly, these compounds are outside the scope of the present invention.

What is claimed is:

1. A compound of the formula:

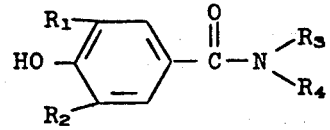

wherein $R_1$ and $R_2$ are each branched-chain alkyl of 3 to 8 carbon atoms and $R_3$ and $R_4$ are both alkyl of 8 carbon atoms, or cycloalkyl of 5 or 6 carbon atoms.

2. A compound as defined in claim 1 wherein $R_1$ and $R_2$ are each t-butyl.

3. A compound as defined in claim 1 wherein $R_3$ and $R_4$ are both cyclohexyl or n-octyl.

4. A compound as defined in claim 3 wherein $R_1$ and $R_2$ are each t-butyl.

5. A compound as defined in claim 4 which is N,N-dicyclohexyl-3,5-di-t-butyl-4-hydroxybenzamide.

6. A compound as defined in claim 4 which is N,N-di-n-octyl-3,5-di-t-butyl-4-hydroxybenzamide.

* * * * *